Jan. 2, 1962     R. W. REYNOLDS ETAL     3,015,157

METAL FABRICATION

Filed March 10, 1959

INVENTORS:
RICHARD W. REYNOLDS
WALLACE C. JOHNSON
BY

ATTORNEYS

United States Patent Office 3,015,157
Patented Jan. 2, 1962

3,015,157
METAL FABRICATION
Richard W. Reynolds, Norwich, and Wallace C. Johnson, Hamden, Conn., assignors to Olin Mathieson Chemical Corporation, East Alton, Ill., a corporation of Virginia
Filed Mar. 10, 1959, Ser. No. 798,398
4 Claims. (Cl. 29—470.9)

This invention relates to the art of welding and more particularly to pressure welding together of carbon steel sheets.

In the fabrication of composite structures by the pressure welding of two or more metal sheets into a composite structure, it is conventional to heat a metal pack to a very high temperature approaching the melting point of one of the metals followed by pressing, as by rolling, in which the metals are deformed against each other at the elevated temperature. Generally, the welding surfaces of the metal sheets are suitably prepared before rolling by thoroughly cleansing the surfaces of contaminants and impurities. This is accomplished in any conventional manner as by abrading with steel wool or by washing with alcohol or xylene or some other suitable solvent. The clean surfaces are then placed in an adjacent position to each other with the plates appropriately attached together, before heating, to prevent relative movement between each other during the initial heating and rolling pass. This may be accomplished by spot-welding, heli-arc welding about the edges, or other suitable methods. The assembled sheets are then heated within their corresponding welding temperature ranges and rolled while at such temperature. The furnace temperatures generally employed with carbon steel are between 2100° F. to 2250° F.

In pressure welding, if the temperatures are reduced, rolling pressures must be increased with corresponding requirements of higher percentage reductions in the cross-sectional areas of the pack to effect welding across the interface of adjacent metal sheets. In general, the pressures required for pressure welding vary inversely with the temperature to which the pack is heated.

The temperature to which thick metal packs, for forging are heated, is in the vicinity of 320° F. of the melting point of the alloys employed, which for carbon steel, as noted above, is of the order of 2100° F. to 2250° F. The percent reductions effected, for such thick body packs, during welding range from as low as 35% to as high as 1000%.

Heretofore, when reductions below 35%, in the cross-sectional area in a heated pack, are employed, as in U.S. Patent No. 2,753,623, only sporadic and incipient bonds are formed across the interface of adjacent sheets necessitating additional operations, such as annealing to develop a strong bond. As stated by the patentee, when such sporadic bonds withstand peeling against manual pulling away of the strips by use of a vise and pliers, the bond is considered "very good." When, as in the instant invention, the welded sheets must withstand peeling at pressures of the order of 1000 pounds p.s.i., or more, the welds of the patentee's structures, obtained at his low reductions, are unable to withstand peeling without additional steps further developing the weld, as by annealing.

Failure to form a strong weld at low reduction in present day methods can be better understood by a theory most indorsed and accepted by producers of clad metals in which hot rolling is used to produce the pressure weld. According to this theory, the presence of any oxide on the welding surfaces of any metal is detrimental to good welding, and for most metals the presence of any oxide, however small the quantity, makes welding difficult. This prevailing theory is that the oxide on the surfaces will form islands through which only a weak weld will form. As the length of the pack is increased, at least fourfold, during hot rolling, new metal surfaces come into contact and weld between the islands of oxides. This is why the conventional practice, as with aluminum and copper, is to employ at least 65% reduction in order that enough new surface metal, which is believed not to be oxidized, will be formed so as to disperse the oxidized areas into a relatively small portion of the final welded area. On this theory, failure of welding across the interface of adjacent sheets in a hot-rolled pack depends upon the weld preventing power of the oxide. Accordingly, when low percentage of reduction, below 65% and especially below 35%, are employed, although the deformation causes the oxidized surfaces to break into what has been described as islands of oxides, these oxides still continue to form a relatively large proportion within the final welded area. Although welding of the interface occurs around these hard oxide islands, a relatively large portion of the welding surfaces, defined by the oxides, fails to weld causing what ise called spoadic or incipient welds.

It has been discovered that with respect to carbon steels a complete weld can be obtained across the entire interface of adjacent metal sheets not only at unthought-of low percentage reduction, but even at temperatures well below the 2100° to 2250° F. conventionally employed in pressure welding thick packs of carbon steels together. Such welding may be obtained in accordance with this invention by heating a pair of relatively thin sheets of carbon steel to between 1400° F. and 1750° F. and rapidly cooling or chilling the exterior surfaces of the pack to provide multi-temperature zones in the pack. These zones consist of a center zone, at the welding surface, at substantially the temperature to which the pack was heated bounded by cooler zones at the surfaces of the pack, which have been purposely cooled. Simultaneously with the cooling, the invention involves deforming the metal sheets against each other under great pressure, as by rolling, to obtain a reduction in the cross-sectional area of the pack. Such cooling is generally obtained by chilling the pack between relatively larger and much colder steel rolls, employed for the pressure welding, to provide the aforementioned multi-temperature zones. This quenching or chilling action of the pack is obtained by maintaining the large rolls at a temperature greatly below the temperature of the hot pack, and which have sufficient mass to radiate the heat transferred thereto from the heated pack. It will be readily apparent that water cooled rolls may also be employed if of sufficiently large diameter and of sufficient cooling capacity to instantly cool the exterior surface of the pack providing the required multiplicity of zones within the pack is obtained in accordance with this invention. For example, when two thin sheets of carbon steel have been superposed, heated and chilled in the aforesaid manner, the portions of each sheet at the interface will be substantially at the temperature to which the pack was heated sandwiched by the relatively cooled portions of the metal adjacent the cold steel rolls.

The amount of chilling or quenching of the pack is dependent not only upon the thickness and specific heat of the metal being chilled by rolling, but will also be, in addition, dependent upon the diameter of the steel rolls, their speed of rotation, and to the initial temperature to which the pack was heated. Although all of the conditions cannot be specifically defined herein, these variables, for example, the speed of rotation of the rolls, initial temperature, the specific amount of chilling required, the thickness of the pack and the diameter of the steel rolls can be readily correlated by one skilled in the art of pressure welding by hot-rolling.

In accordance with this invention, the red-hot metal pack of carbon steel is quickly cooled when it comes in contact with the cool metal of the steel rolls having a sufficiently much greater mass than the hot metal, such as a 1/8-inch thick pack between two rolls each of a 20 inch diameter, or with rolls provided with supplementary cooling means. As the thin red-hot carbon steel pack enters the rolling mill, at even reductions of 20% or less, the exterior surfaces of both the top and bottom thin sheets instantly give up their heat to the large cold rolls. This heat transfer is greater at the point of contact of each sheet to each roll and leaves the interior or adjacent surfaces of the pack considerably hotter than the outer faces of the sheets.

Thus, due to this chilling or quenching action of the rolls, the portion or zone of the metal sheets adjacent their interface of the adjoining sheets will remain hot and plastic, at the temperature to which the pack was heated. For example, this quenching action of the rolls, at a rotational speed of 100 feet per minute, drops the temperature at the surface of a 1/8-inch thick carbon steel pack, which has been heated to 1600° F., to a temperature of 1200° F. as it leaves the rolls after welding of the component sheets while the zone at the interface remains at substantially 1600° F.

In addition, use of such low temperatures of the order of 1600° F., well below conventional temperatures of 2100° F. to 2250° F. heretofore employed, is also believed to retard oxidation of the metal during the heating to temperature, and to facilitate bonding of adjacent surfaces even though these adjacent surfaces may be partially oxidized. It is believed that in the temperature range of from 1500° F. to 1800° F., preferably employed in accordance with this invention, iron oxide is to some extent diffused under the intense pressure of hot rolling so that the islands of oxides are not as weld preventing, and, therefore, do not need to be so widely dispersed thus allowing a good weld to form at reductions as low as 10% to 20%. At these temperatures it is believed that iron oxide is far more plastic than, for example, aluminum oxide which is always hard and never plastic at the temperature employed for welding aluminum, at a rolling reduction of 65% minimum.

Although a small amount of iron oxides has been found not to be harmful, it is to be understood that excessive oxidation of the welding surfaces is detrimental. Accordingly, in order to decrease the formation of harmful quantities of oxides, it was found that heating the thin carbon steel sheets in a non-oxidizing atmosphere, such as nitrogen, was necessary to prevent excessive oxidation of the welding surfaces. By heating in this or similar non-oxidizing atmospheres, the exterior surfaces of the sheets are also kept free of mill-scale and will finish rolling to a smoother surface. Results obtained with packs spot-welded at their corners proved quite favorable in comparison to packs whose edges have been arc welded so as to seal out all of the atmosphere.

Further, use of such low temperatures of the order of 1500° F. to 1800° F. was found to further facilitate welding since the packs within this temperature range are much colder than conventional carbon steel packs at the conventional welding temperatures of the order of 2100° F. to 2250° F., permitting a greater compressible force to be exerted in the plastic interface of the adjacent metal sheets despite the low percent reduction employed during welding. In this manner, during roll welding, a minimum amount of deformation exerted by the rolls, will be absorbed by the cooler and less plastic zones with the maximum amount of reduction in thickness taking place in the hotter and more plastic zones adjacent the interface of adjoining carbon steel sheets. Thus, most of the deformation takes place in the plastic interface.

The weld strength, despite the low temperature and percent reductions employed, is sufficient to withstand peeling even though pressures exerted against the weld are above 1000 pounds per square inch and particularly between the range of 3000 pounds per square inch to 10,000 per square inch. It is to be understood that the term "weld strength" is a purely relative term; however, "good" a pressure-weld is called depends upon how the strength is evaluated or what method is used to test it. As is known, thousands of tons of clad stainless steel are produced yearly by several steel mills using the sandwich method in which 1/2 inch plates of stainless steel are pressure welded, by hot-rolling at 2150° F., to relatively thick (4" to 6") steel slabs. The required weld strength of these clad metals is, in comparison with the welded structure of this invention, quite low. This is because the stainless veneer is never pulled away from the steel base during fabrication in which the clad plate is only bent, generally to a large radius when it is formed into a pipe or large diameter tank shell. Some of the finished products, such as tanks and pressure vessels, do have to withstand an internal vacuum, however, this can only be considered a low separating force, on the weld, in comparison to hollow articles, fabricated in accordance with this invention, which are often inflated at several thousand pounds p.s.i., even at high pressures of the order of 10,000 p.s.i. To test the bond strength of regular clad plate, a fabricator will bend a sample, cut from a purchase plate of 180°, on a reasonable radius, and then bend it back to its original flat condition. While this test exceeds the separating force that the conventional clad plate will encounter during fabrication, it is still well below the force required to be exerted on the articles pressure-welded, in accordance with this invention, to cause separation or peeling of the welded carbon steel sheets.

When the prior art is evaluated with respect to the type of weld obtained, it should be kept in mind that when a "pressure weld," a "weld" or a "bond" is employed these are relative terms, and in all cases the weld strength which has been obtained is generally far below that obtained in the instant invention. For example, Boessenkool in two patents, U.S. No. 2,691,815 of October 19, 1954, and U.S. No. 2,753,623 of July 10, 1956, evaluates the strength of the weld in the final products by his ability to "pull one strip away from another, by using a pair of pliers." When he has considerable difficulty in manually peeling the strips apart the bond is "very good." Since the weld strength of an embodiment of this invention as in an evaporator panel, capable of withstanding inflation pressures in excess of thousands of pounds p.s.i., is greatly in excess of any force that can be developed by pulling away with a pair of pliers, what Boessenkool considers a very good bond is still far below that required when inflating the aforesaid embodiment of this invention in which the walls of a round tube must rupture under free inflation before the pressure-weld will peel as in a standard production test.

Accordingly, it is the object of this invention to provide a novel process wherein relatively thin carbon steel sheets may be pressure-welded together into a unitary combined structure.

Another object of this invention is to provide a novel process of welding together a plurality of carbon steel sheets at reduced conditions of temperature and applied pressure heretofore thought impossible.

A still further object of this invention is to provide a novel process for pressure welding relatively thin carbon steel sheets together at reduced rolling temperatures whereby a substantially complete weld is obtained, after hot-rolling, across the interface of adjacent surfaces.

Other objects and advantages will become apparent from the following description and drawings in which.

Figure 1:
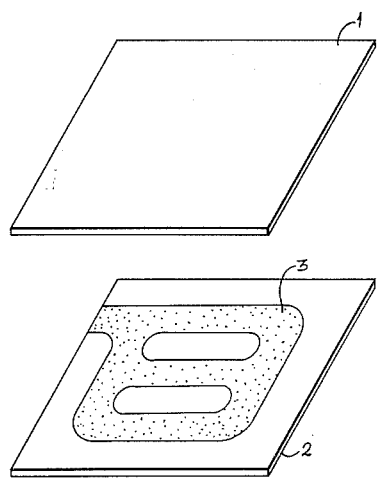
FIGURE 1 is a perspective view of an embodiment of this invention showing a pair of carbon steel sheets to be joined together in accordance with this invention.
Figure 2:
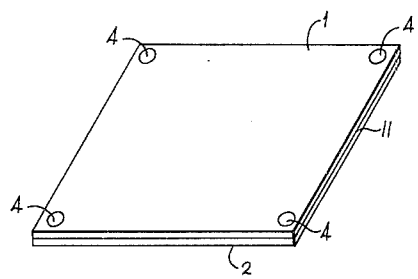
FIGURE 2 is a perspective view illustrating the embodiment of FIGURE 1 after superimposition of a pair of sheets for welding.
Figure 3:
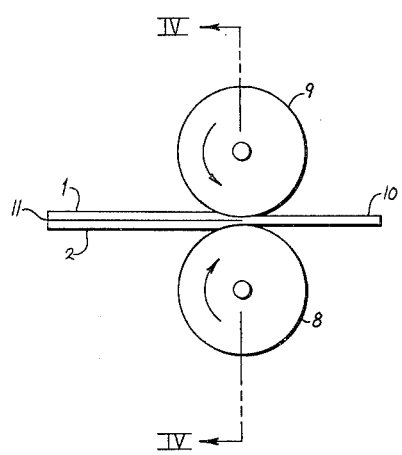
FIGURE 3 is an elevational view illustrating the welding of the superposed sheets of FIGURE 2 between large mill rolls.
Figure 4:
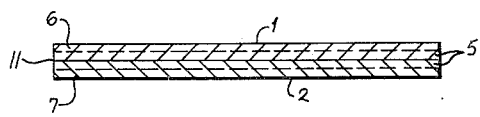
FIGURE 4 is a cross-sectional view taken along lines IV—IV of FIGURE 3.

The invention will be more specifically described with reference to the drawings in which 1 and 2 represent sheets of SAE 1010 cold-rolled steel of 0.108 inch in thickness which upon superimposition of the two sheets of metal form a pack of 0.216 inch in thickness. The welding surfaces of sheets 1 and 2 were degreased by a fifteen minute soaking in a hot solution composed of fifteen ounces of sodium orthosilicate per gallon of water to which a wetting agent has been added. After degreasing the welding surfaces 1 and 2 were further cleaned by immersion for ten minutes in a hot bath of sulfuric and hydrochloric acids present in concentration of 10% each per gallon. After immersion for ten minutes the plates were then swabbed in 20% hydrochloric acid at room temperature. As noted above, small amounts of rust were not found to be detrimental to obtaining a weld in accordance with this invention, and accordingly, the preferred acid treatment step, if desired, may be omitted. However, it will be apparent that if hot-rolled carbon steel is employed, the blue oxide should be preferably removed by any conventional hot acid pickle and a hot water rinse, or as described in the instant example. It has been found that the aforesaid preparation of the welding surfaces of the carbon steel sheets is sufficient for welding, however, if desired, the welding surface of the sheets may be further treated by scratching or roughing thereof by means of wire brushes or emery cloth.

A weld preventing material is then applied in a thin layer to selective areas on the clean surfaces of the sheet according to a predetermined pattern 3. The consistency of the suspension is such to permit its application by spraying through a mask die, painting through a stencil, squeezing through a silk screen, or in any suitable manner, such as painting. The weld preventing material may be either a graphitic material, a water suspended titanium dioxide or any other suitable material. However, since all ferrous metals will pick up carbon at the rolling temperatures contemplated in this invention, a different type of weld preventing material should preferably be used. Several of the high melting oxides, that are commonly used in welding of clad steels, such as aluminum oxide, magnesium oxide, titanium dioxide, zirconium oxide, etc., are illustrative of the weld preventing materials which are preferred for welding of carbon steels. All of these enumerated oxides give good results when applied as a paint in a simple pattern with a paint brush. However, for good silk screening, they must be uniformly ground to a fine particle size and formulated with an appropriate suspension and wetting agent along with sufficient amounts of adhesive so that the formulation will adhere to a smooth surface and not pop up during heating. A suitable composition employing either titanium dioxide or zirconium oxide can be formulated as follows: To 600 grams of fine $TiO_2$ is added 20 grams of bentonite-clay, thoroughly dry mixed, followed by slow addition of 650 cc. of water while stirring in a rotary mixer. This forms a creamy compound suitable for silk screening. For stronger adherence to a cold-rolled surface, 5% of sodium silicate can be added to the water used. Another stop-weld found suitable consists of a titanium oxide base suspended with an organic suspension agent, such as starch, and binder. Although a percentage of organic content is present due to the use of the suspension agent, no carburization in the bonded carbon steel sheets was detected by micro studies.

After sheets 1 and 2 have been superimposed upon each other, they are appropriately held together to prevent relative movement between each other by any convenient means, such as only spot-welding at the corners, as at 4, or welding about the four adjoining edges by the heli-arc method. The pack is then heated for ten to fifteen minutes in a non-oxidizing atmosphere, such as DX or $N_2$ gas, to 1650° F.

In accordance with the above process, six separate packs were prepared and welded at approximately 75 feet per minute through cold steel rolls 8 and 9 in accordance with this invention. The mass of rolls was sufficient to be maintained at a temperature greatly below the temperature of the metal entering between them in order to rapidly quench and cool the exterior surfaces of the plate thus providing multi-temperature zones within the pack consisting of a center hot zone 5 about the interface, at substantially the temperature, 1650° F., to which the pack was heated bound by cooler zones 6 and 7 at the surfaces chilled by heat exchange with the relatively much colder steel rolls. Simultaneously, with the chilling the rolls deform sheets 1 and 2 against each other at approximately a 15% reduction in the cross-sectional area of the pack. The speed employed, 75 feet per minute, was sufficient to drop the temperature of the carbon steel pack from a bright 1600° F. as it enters the rolls to approximately a dull 1200° F. as it leaves the rolls. This very rapid drop in temperature as the thin sheets are passing between the cold rolls of the mill, at a speed of about 75 feet per minute, sets up a terrific crushing force even under 20% reduction, at the interface of adjacent surfaces where the sheets are both of the hottest and most plastic. As soon as the welded area is released from contact with the cold rolls, as it passes through the mill, some of its internal temperature returns to the surfaces of the pack.

At this point, without annealing at 0.172" thickness, two of the units were inflated with a hydraulic fluid to check the completeness of the pressure-weld. It was found that upon inflation the weld failed to peel even at pressures of 10,000 p.s.i. Although the completeness of the weld was established at this point of the process, the welded plates were further processed by further cold rolling at approximately a 30% reduction to 0.125 inch in thickness in order to obtain a more smooth and even surface on the pack and to obtain the final gauge thickness desired. The plate was then annealed at 1600° F. for an hour to remove the cold working of the metal in order to obtain the ductility desired for a subsequent inflation step. The remaining four units were then free-inflated to approximately three times the thickness of the pack by injection within th pack of a fluid pressure at a magnitude of 10,000 pounds p.s.i. so as to permanently distend the welded structure in the area defined by the weld preventing material. During and subsequent the inflation operation, no evidence was found of peeling of the pressure-weld at these high inflation pressures.

Although only a 15% reduction may be employed in obtaining a complete weld across the interface of the adjoining carbon steel sheets, it is to be understood that this reduction is merely illustrative and is not intended to exclude higher reductions which at these low temperatures are also operative and often used to increase the rolling length. It was found that the pressure-welds made with a 50% reduction are no stronger than the pressure-welds obtained at a 15% reduction. For example, use of higher percentage reductions will be illustrated in the following example employing two sheets of SAE 1010 hot roll carbon steel superimposed upon each other subsequent to degreasing and pickling of the welding surfaces by conventional means, such as a vapor type degreaser. A pattern of weld preventing material, such as 3 was interposed in a predetermined design between the adjacent sheets. The superimposed sheets were then spot welded at four corners and heated for about 10 to 15 minutes to 1750° F. in a protective atmosphere consisting of approximately 97% nitrogen, 1½% carbon monoxide and 1½% hydrogen. The heated sheets were pressure-welded between relatively large and much colder steel rolls in accordance with this invention with a reduction of 28% in a cross-sectional area of the pack. The pack, as in the preceding example, was further reduced 38% in cross-sectional area to obtain a desired gauge, and annealed at 1300° F. to 1350° F. to obtain the ductility for inflation. After softening of the welded pack by the annealing operation, the unjoined portion was expanded by injecting therein a fluid pressure of a magnitude of 3500 p.s.i. to permanently distend the welded blank in the unjoined area defined by the pattern of weld preventing material.

As previously noted, the heating of the superimposed carbon steel sheets prior to welding, in accordance with this invention, is between the temperature range of 1400° F. to 1800° F. Failure to heat the blank up to these temperatures fails to produce a satisfactory weld even at reductions extending from 25% to 65%. For example, at a rolling temperature of 1200° F. the weld peeled under inflation at pressures of as low as 1250 p.s.i. Such peeling indicated that only sporadic bonds are obtained across the interface of the adjacent sheets when the temperature is below 1400° F. It is to be understood that by the carbon steel contemplated in this invention is meant a steel that owes its properties chiefly to its presence of carbon without substantial amounts of other alloying elements, and is not indicated to exclude the presence of elements, such as manganese, silicon and the like, as impurities in minor amounts which do not appreciably effect the property of the steel.

Although the invention has been described with reference to specific embodiments, materials and details, various modifications and changes will be apparent to one skilled in the art and are contemplated to be embraced within the invention.

What is claimed is:

1. A method of making pressure welded composite structures comprising forming a pack by superposing two carbon steel sheets; heating said pack to a temperature within the range from about 1400° F. to about 1800° F.; and deforming said pack to effect a reduction of about 10% to 28% in the cross-sectional area of said pack to produce a substantially complete and uniform weld across the adjacent surfaces of said sheets by passing said pack between rolls maintained at a temperature sufficiently below the temperature of said pack to quickly cool the exterior surfaces of said sheets to a temperature which is substantially below the welding temperature of said sheets while maintaining the inner surfaces of said sheets at said welding temperature, said weld being produced without any further thermal or pressure treatment.

2. A method of making pressure welded composite structures comprising forming a pack by superposing carbon steel sheets having weld preventing material arranged in a predetermined pattern between adjacent sheets; heating said pack to a temperature within the range from about 1400° F. to about 1800° F.; and deforming said pack to effect a reduction of about 10% to 28% in the cross-sectional area of said pack to produce a substantially complete and uniform weld across the adjacent surfaces of said sheets by passing said pack between rolls maintained at a temperature sufficiently below the temperature of said pack to quickly cool the exterior surfaces of said sheets to a temperature which is substantially below the welding temperature of said sheets while maintaining the inner surfaces of said sheets at said welding temperature, said weld being produced without any further thermal or pressure treatment.

3. The method of claim 2 wherein said pattern corresponds to a desired system of fluid passages.

4. The method of claim 2 wherein said heating is done in a non-oxidizing atmosphere.

References Cited in the file of this patent

UNITED STATES PATENTS

| | | |
|---|---|---|
| 2,392,824 | Lytle et al. | Jan. 15, 1946 |
| 2,498,275 | Johnson | Feb. 21, 1950 |
| 2,691,208 | Brennan | Oct. 12, 1954 |
| 2,753,623 | Boessenkool et al. | July 10, 1956 |
| 2,759,246 | Campbell | Aug. 21, 1956 |
| 2,772,180 | Neel et al. | Nov. 27, 1956 |
| 2,782,498 | Mushovic et al. | Feb. 26, 1957 |